United States Patent
Uchino et al.

(10) Patent No.: US 12,289,617 B2
(45) Date of Patent: Apr. 29, 2025

(54) COMMUNICATION DEVICE, CONTROL CIRCUIT, AND STORAGE MEDIUM

(71) Applicant: Mitsubishi Electric Corporation, Tokyo (JP)

(72) Inventors: Daichi Uchino, Tokyo (JP); Kazuaki Ishioka, Tokyo (JP); Yusuke Kinoshita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 360 days.

(21) Appl. No.: 17/867,167

(22) Filed: Jul. 18, 2022

(65) Prior Publication Data
US 2022/0353700 A1 Nov. 3, 2022

Related U.S. Application Data

(63) Continuation of application No. PCT/JP2020/010003, filed on Mar. 9, 2020.

(51) Int. Cl.
*H04W 16/28* (2009.01)
*H04W 72/044* (2023.01)

(52) U.S. Cl.
CPC ......... *H04W 16/28* (2013.01); *H04W 72/046* (2013.01)

(58) Field of Classification Search
CPC .. H04W 16/28; H04W 72/046; H04B 7/0695; H04B 7/0617; Y02D 30/70
See application file for complete search history.

(56) References Cited

U.S. PATENT DOCUMENTS

| | | | |
|---|---|---|---|
| 2016/0037420 A1* | 2/2016 | Gaal | H04W 72/541 370/331 |
| 2020/0076488 A1* | 3/2020 | Brunel | H04B 7/063 |
| 2020/0162289 A1* | 5/2020 | Ahn | H04L 25/0224 |
| 2020/0212988 A1* | 7/2020 | Lim | H04B 7/0695 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 15)", 3GPP TS 36.300 V15.3.0, Sep. 2018, pp. 1-358.

(Continued)

*Primary Examiner* — Shailendra Kumar
(74) *Attorney, Agent, or Firm* — Birch, Stewart, Kolasch & Birch, LLP (57) ABSTRACT

A communication device is a base station that communicates with mobile terminals by radiating communication beams within a coverage, the communication beams including a first beam and a second beam having a shorter radio wave propagation distance than the first beam at a same transmission power, the coverage including a plurality of virtual cells. The communication device includes: a grouping processing unit that groups the plurality of virtual cells such that virtual cells in which mobile terminals capable of uplink communication using the first beam and incapable of uplink communication using the second beam are located are aggregated; and a beam forming unit that controls a radiation direction of the communication beams such that the communication beams are radiated at a same timing to all virtual cells belonging to a same group.

13 Claims, 8 Drawing Sheets

(56) References Cited

U.S. PATENT DOCUMENTS

2020/0229206 A1\* 7/2020 Badic ................ H04W 52/0209
2021/0083728 A1\* 3/2021 Cheraghi ............. H04B 7/0617

OTHER PUBLICATIONS

"3rd Generation Partnership Project; Technical Specification Group Radio Access Network; Evolved Universal Terrestrial Radio Access (E-UTRA); Further advancements for E-UTRA physical layer aspects; (Release 9)", 3GPP TR 36.814 V9.2.0, Mar. 2017, pp. 1-105.

"3rd Generation Partnership Project; Technical Specification Group Radio Access Network; Feasibility study for Further Advancements for E-UTRA (LTE-Advanced); (Release 15)", 3GPP TR 36.912 V15.0.0, Jun. 2018, pp. 1-62.

"3rd Generation Partnership Project; Technical Specification Group Radio Access Network; Study on New Radio (NR) access technology; (Release 14)"; 3GPP TR 38.912 V14.0.0, Mar. 2017, pp. 1-74.

"3rd Generation Partnership Project; Technical Specification Group Radio Access Network; Study on New Radio Access Technology Physical Layer Aspects; (Release 14)", 3GPP TR 38.802 V14.2.0, Sep. 2017, pp. 1-145.

"3rd Generation Partnership Project; Technical Specification Group Radio Access Network; Study on new radio access technology: Radio access architecture and interfaces; (Release 14)", 3GPP TR 38.801 V14.0.0, Mar. 2017, pp. 1-91.

"3rd Generation Partnership Project; Technical Specification Group Radio Access Network; Study on New Radio Access Technology; Radio Interface Protocol Aspects; (Release 14)"; 3GPP TR 38.804 V14.0.0, Mar. 2017, pp. 1-57.

"3rd Generation Partnership Project; Technical Specification Group Services and System Aspects; Study on Architecture for Next Generation System; (Release 14)", 3GPP TR 23.799 V14.0.0, Dec. 2016, pp. 1-522.

"Evaluation on packet duplication in multi-connectivity", 3GPP R2-1700172, 3GPP TSG-RAN2 NR Ad Hoc, Spokane, Washington, US, Jan. 17-19, 2017, total 7 pages.

"Forward compatible robust features in NR", 3GPP R2-1701472, 3GPP TSG-RAN WG2 NR #97 Meeting, Athens, Greece, Feb. 13-17, 2017, total 5 pages.

"Intra-NR Dual-Connectivity Options", 3GPP R2-1700982, 3GPP TSG-RAN WG2 Meeting #97, Athens, Greece, Feb. 13-17, 2017, pp. 1-3.

"LS on HNB/HeNB Open Access Mode", 3GPP S1-083461, 3GPP TSG-SA1 #42, Seoul, South Korea, Oct. 13-17, 2008, total 2 pages.

"Report of 3GPP TSG RAN WG2 AdHoc on NR", 3GPP R2-1700672, 3GPP TSG-RAN Working Group 2 meeting #97, Athens, Greece, Feb. 13-17, 2017, pp. 1-76.

International Search Report for PCT/JP2020/010003 mailed on Jul. 7, 2020.

Popovski, et al., "Scenarios, requirements and KPIs for 5G mobile and wireless system", ICT-317669-METIS/D1.1, Apr. 29, 2013, total 84 pages.

Written Opinion of the International Searching Authority for PCT/JP2020/010003 (PCT/ISA/237) mailed on Jul. 7, 2020.

\* cited by examiner

COMMUNICATION DEVICE, CONTROL CIRCUIT, AND STORAGE MEDIUM

CROSS-REFERENCE TO RELATED APPLICATION

This application is a continuation application of International Application PCT/JP2020/010003, filed on Mar. 9, 2020, and designating the U.S., the entire contents of which are incorporated herein by reference.

BACKGROUND OF THE INVENTION

1. Field of the Invention

The present disclosure relates to a communication device, a control circuit, and a storage medium that are applied to a mobile communication system.

2. Description of the Related Art

In the 3rd Generation Partnership Project (3GPP), which is an association for standardizing mobile communication systems, a communication scheme called Long Term Evolution (LTE) has been developed for wireless sections, and a communication scheme called System Architecture Evolution (SAE) has been developed for overall system configurations including core networks and wireless access networks (hereinafter may be collectively referred to as networks) (see 3GPP TS 36.300 V15.3.0, for example).

As LTE access schemes, Orthogonal Frequency Division Multiplexing (OFDM) is used for downlink, and Single Carrier Frequency Division Multiple Access (SC-FDMA) is used for uplink. Unlike Wideband Code Division Multiple Access (W-CDMA), LTE does not include circuit switching, but supports only packet communication.

3GPP has formulated standards for Long Term Evolution-Advanced (LTE-A) as Release 10. LTE-A is based on the wireless section communication scheme of LTE, and additionally includes several new technologies.

LTE-A systems employ Carrier Aggregation (CA), in which two or more Component Carriers (CCs) are aggregated in order to support wider transmission bandwidths up to 100 MHz.

When CA is configured, User Equipment (UE) that is a mobile terminal has only one Radio Resource Control (RRC) connection with a network (NW). In the RRC connection, one serving cell provides Non-Access Stratum (NAS) mobility information and security input. This cell is referred to as a Primary Cell (PCell). In the downlink, the carrier corresponding to the PCell is a Downlink Primary Component Carrier (DL PCC). In the uplink, the carrier corresponding to the PCell is an Uplink Primary Component Carrier (UL PCC).

Depending on UE capabilities, a Secondary Cell (SCell) can be configured to form a set of serving cells together with the PCell. In the downlink, the carrier corresponding to the SCell is a Downlink Secondary Component Carrier (DL SCC). In the uplink, the carrier corresponding to the SCell is an Uplink Secondary Component Carrier (UL SCC).

For one UE, a set of serving cells consisting of one PCell and one or more SCells is configured.

Other new technologies of LTE-A include technology for supporting wider bands (Wider bandwidth extension), Coordinated Multiple Point transmission and reception (CoMP) technology, and the like.

In addition, 3GPP has developed the use of small eNBs (also referred to as small base station devices) constituting small cells in order to cope with enormous future traffic. For example, technology for enhancing the efficiency of frequency utilization and increasing the communication capacity by installing a large number of small eNBs and configuring a large number of small cells has been developed. A specific example of this technology is Dual Connectivity (DC), in which a UE is connected to and communicates with two eNBs.

One of the eNBs involved in DC may be referred to as a Master eNB (MeNB), and the other may be referred to as a Secondary eNB (SeNB).

There is an increasing trend in the traffic volume of mobile networks, and communication speed is also increasing. Further increase in communication speed is expected after the start of full-scale operation of LTE and LTE-A.

Furthermore, fifth-generation (hereinafter may be referred to as "5G") wireless access systems have been developed for advanced mobile communication and targeted for service launch in 2020 or later. For example, in Europe, requirements for 5G have been compiled by an association called Mobile and wireless communications Enablers for Twenty-twenty Information Society (METIS).

The requirements for 5G wireless access systems include 1000 times larger system capacity, 100 times higher data transmission rate, $\frac{1}{10}$ lower data processing latency, and 100 times more communication terminals simultaneously connected than LTE systems, so as to achieve further reduction in power consumption and reduction in device cost.

In order to satisfy these requirements, 3GPP has devised 5G standards as Release 15. Technology for 5G wireless sections is referred to as "New Radio (NR) Access Technology", which includes several new technologies under development. Examples of technologies under development include packet replication based on DC and Multi-Connectivity (MC), and technology for separating a next generation NodeB (gNB) into a Central Unit (CU) and a Distributed Unit (DU).

In a wireless communication system that supports 5G, mobile terminals of various service types coexist. For example, large-capacity terminals, i.e. mobile terminals that transmit large-capacity data such as video, need to perform uplink transmission after reserving uplink radio resources for the base station. On the other hand, other mobile terminals different from large-capacity terminals, that is, mobile terminals whose data transmission capacity is not so large, can perform uplink transmission without reserving uplink radio resources for the base station. The base station needs to secure a certain amount of radio resources for mobile terminals that perform uplink transmission without reserving radio resources, which may leave some radio resources unused and cause a reduction in the use efficiency of radio resource. For example, consider a case in which a large-capacity terminal performs uplink transmission while a mobile terminal that performs uplink transmission without reserving radio resources does not perform uplink transmission. In this case, the radio resources secured for the mobile terminal that is not the large-capacity terminal cannot be used in the uplink communication of the large-capacity terminal and thus are wasted. Therefore, it is desirable to secure as few radio resources as possible for mobile terminals that are not large-capacity terminals.

SUMMARY OF THE INVENTION

To solve the problem and achieve the object described above, the present disclosure is directed to a communication device constituting a base station that communicates with mobile terminals by radiating communication beams within a coverage, the communication beams including a first beam and a second beam having a shorter radio wave propagation distance than the first beam at a same transmission power, the coverage including a plurality of virtual cells, the communication device including: a grouping processing unit to group the plurality of virtual cells such that virtual cells in which mobile terminals capable of uplink communication using the first beam and incapable of uplink communication using the second beam are located are aggregated; and a beam forming unit to control a radiation direction of the communication beams such that the communication beams are radiated at a same timing to all virtual cells belonging to a same group.

DETAILED DESCRIPTION OF THE PREFERRED EMBODIMENTS

Hereinafter, a communication device, a control circuit, and a storage medium according to an embodiment of the present disclosure will be described in detail with reference to the drawings.

Embodiment

Figure 1:
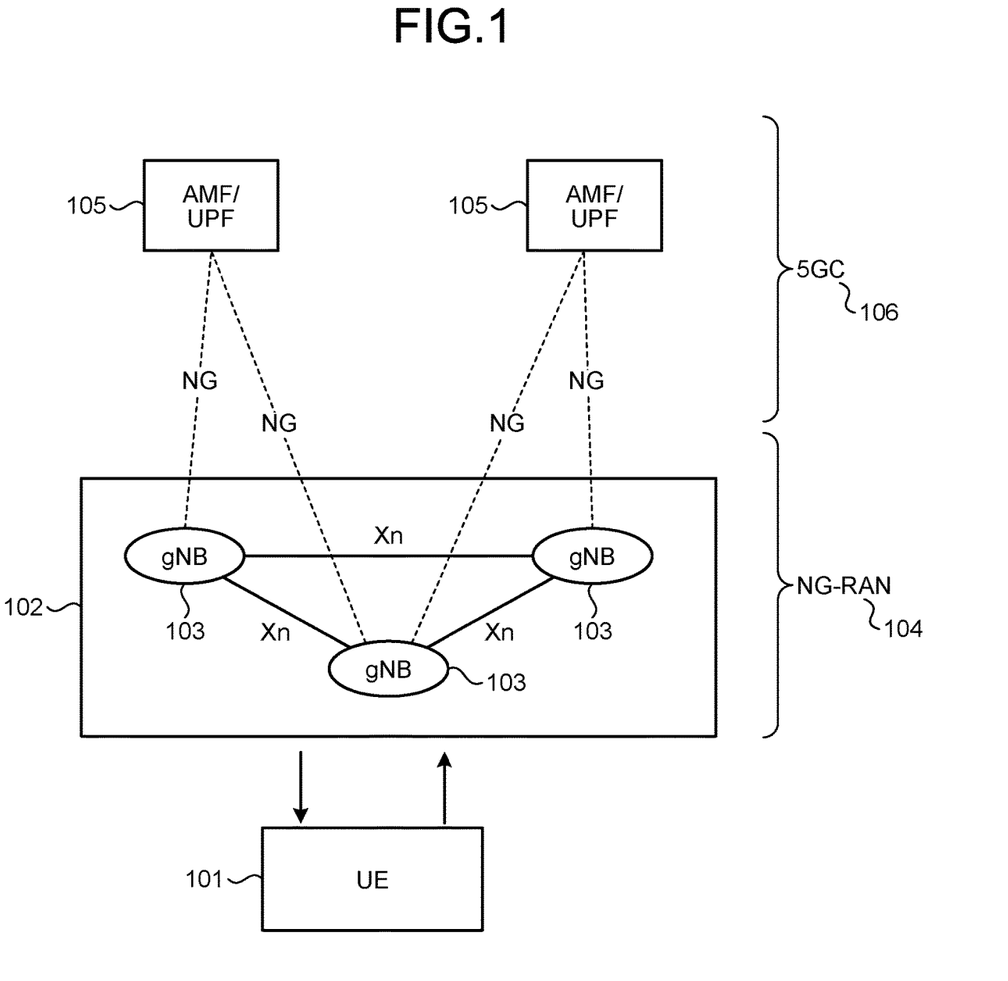
FIG. 1 is a diagram illustrating an overall configuration of a wireless communication system to which a communication device according to an embodiment is applied.

FIG. 1 is a diagram illustrating an overall configuration of a wireless communication system to which a communication device according to an embodiment is applied. The wireless communication system configured as illustrated in FIG. 1 is a wireless communication system discussed in 3GPP. As illustrated in FIG. 1, the wireless communication system includes Next Generation-Radio Access Network (NG-RAN) 104 which is a wireless access network, and a 5G Core Network (5GC) 106 which is a core network. Note that the NG-RAN 104 and the 5GC 106 may be collectively referred to as the network.

The NG-RAN 104 includes one or more base stations 103 denoted by gNB in FIG. 1. In FIG. 1, the number of base stations 103 included in a base station group 102 and constituting the NG-RAN 104 is three, which is only an example. Each of the base stations 103 is connected to other base stations 103 via Xn interface, and transmits and receives control information via Xn interface.

The base station 103 is a communication device according to the present embodiment. The base station 103 can wirelessly communicate with a mobile terminal 101 denoted by UE in FIG. 1, and transmits and receives signals by wireless communication. The mobile terminal 101 can be not only a mobile communication terminal but also a sensor device. Examples of the control protocol of the base station 103 for the mobile terminal 101 include Packet Data Convergence Protocol (PDCP), Radio Link Control (RLC), Medium Access Control (MAC), and Physical Layer (PHY). In a case where the control protocol is terminated in the base station group 102, the NG-RAN 104 includes one or more base stations 103. A range in which the base station 103 is communicable with the mobile terminal 101 is called a coverage. The base station 103 communicates with the mobile terminal 101 by forming one or more beams and radiating the beams within the coverage. In the following description, a range which is implemented by one beam and in which the base station 103 and the mobile terminal 101 are communicable is referred to as a virtual cell. A set of virtual cells is a coverage. Note that there is an upper limit to the number of beams that the base station 103 can form at a time. In addition, the number of virtual cells constituting the coverage is generally larger than the upper limit value of the number of beams that the base station 103 can form at a time. Therefore, the base station 103 communicates with each mobile terminal 101 in the coverage by forming beams multiple times while changing the radiation direction.

The 5GC 106 includes one or more higher-level devices 105 denoted by AMF/UPF in FIG. 1. The higher-level device 105 implements Access and Mobility management Function (AMF) and User Plane Function (UPF). Each higher-level device 105 is connected to one or more base stations 103 via Next Generation (NG) interface, and transmits and receives control information and user data to and from the base station 103 via NG interface. Control information is transmitted and received using AMF. User data is transmitted and received using UPF.

The base station 103 may configure one virtual cell or may configure a plurality of virtual cells. Each cell has a predetermined range forming the coverage in which communication with the mobile terminal 101 is possible, and the base station 103 wirelessly communicates with the mobile terminal 101 within the coverage. In a case where one base station 103 configures a plurality of cells, communication with the mobile terminal 101 is possible in each cell.

The wireless communication system illustrated in FIG. 1 can logically divide the physical network to generate a plurality of slices that are virtual networks, and allocate the slices to the mobile terminals 101 of different service types. That is, the base station 103 can simultaneously communicate with a plurality of mobile terminals 101 of different service types using different slices. The generation and management of slices are conducted in the 5GC 106.

Figure 2:
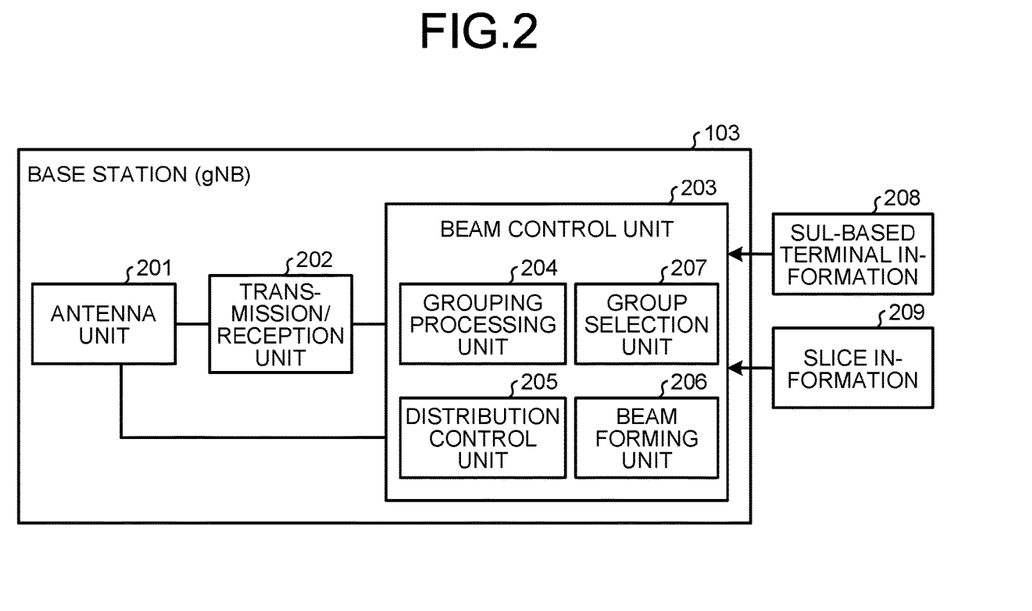
FIG. 2 is a diagram illustrating an exemplary configuration of a base station illustrated in FIG. 1.

FIG. 2 is a diagram illustrating an exemplary configuration of the base station 103 illustrated in FIG. 1, which is a communication device according to the present embodiment. The base station 103 includes an antenna unit 201, a transmission/reception unit 202, and a beam control unit 203. The beam control unit 203 receives SUL-based terminal information 208 and slice information 209 from the 5GC 106. The SUL-based terminal information 208 is information on the mobile terminal 101 that performs uplink transmission using Supplemental Uplink (SUL) discussed in 3GPP. The slice information 209 is information on slices available for communication with the mobile terminal 101.

The antenna unit 201 forms a beam in a direction designated by the beam control unit 203 to radiate a transmission signal output from the transmission/reception unit 202 as radio waves to the mobile terminal 101, and receives radio waves radiated from the mobile terminal 101 to output a reception signal to the transmission/reception unit 202.

The transmission/reception unit 202 performs transmission processing including modulation, frequency conversion, and the like on transmission data to the mobile terminal 101, and performs reception processing including frequency conversion, demodulation, and the like on reception signals from the mobile terminal 101.

The beam control unit 203 includes a grouping processing unit 204, a distribution control unit 205, a beam forming unit 206, and a group selection unit 207, and controls the antenna unit 201 based on the SUL-based terminal information 208 and the slice information 209 such that beams are formed.

The grouping processing unit 204 performs grouping on each virtual cell constituting the coverage of the base station 103 based on the SUL-based terminal information 208.

The distribution control unit 205 distributes radio resources to each slice based on the grouping result from the grouping processing unit 204 and the slice information 209.

The beam forming unit 206 controls the antenna unit 201 such that a beam is formed in the direction in which the mobile terminal 101 allocated radio resources exists.

The group selection unit 207 selects the group to be allocated radio resources next time from among the groups created by the grouping processing unit 204. That is, the group selection unit 207 determines which group the antenna unit 201 is to form the next beams toward the virtual cells belonging thereto.

Figure 3:
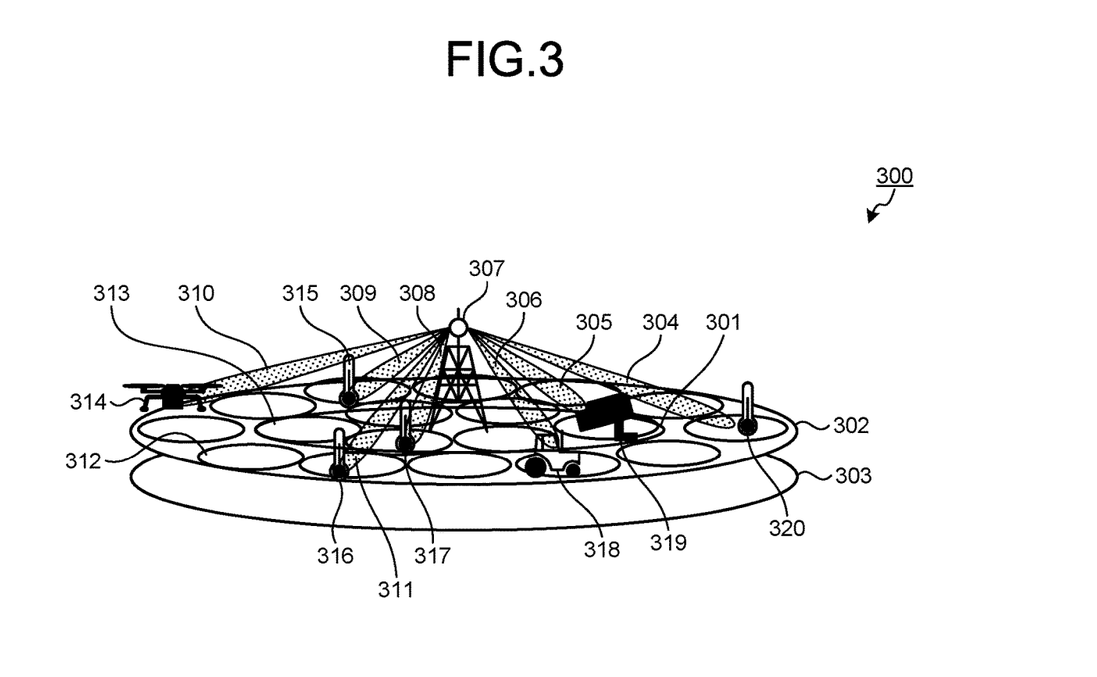
FIG. 3 is a diagram illustrating an example of a wireless communication system according to an embodiment.

The operation of each unit in the beam control unit 203 will be described in detail after the exemplary configuration of a wireless communication system illustrated in FIG. 3 is described.

FIG. 3 is a diagram illustrating an example of a wireless communication system according to an embodiment. The wireless communication system 300 includes a base station 307 and a plurality of mobile terminals 314 to 320.

The mobile terminals 314, 318, and 319 are terminals that transmit large-capacity data, i.e. data having a capacity larger than a predetermined capacity. The mobile terminals 314 and 318 are also terminals that transmit data with low latency. That is, the mobile terminals 314 and 318 are terminals that transmit large-capacity data with low latency. In the following description, the mobile terminals 314 and 318 may be referred to as low-latency terminals for convenience. The mobile terminal 319 is a terminal that transmits large-capacity data but does not need to transmit data with low latency. In the following description, the mobile terminal 319 may be referred to as a large-capacity terminal for convenience. In addition, the mobile terminals 315 to 317 and 320 are terminals that do not transmit large-capacity data and do not need to transmit data with low latency. In the following description, the mobile terminals 315 to 317 and 320 may be referred to as multi-connection terminals for convenience. The mobile terminals 315 to 317 and 320, which are multi-connection terminals, are terminals that can be arranged at a density of 1 million/km².

The base station 307 can use Frequency Range 1 (FR1) and Frequency Range 2 (FR2) when communicating with each mobile terminal in the coverage. Here, the frequency of FR1 is a first frequency, and the frequency of FR2 is a second frequency. The base station 307 may include one communication device capable of transmitting and receiving FR1 and FR2 simultaneously, or may include a communication device that transmits and receives FR1 and a communication device that transmits and receives FR2. FR2 is a frequency band higher than FR1.

In the example illustrated in FIG. 3, the base station 307 is transmitting beams 304 to 306 and 308 to 311 toward different mobile terminals. Each of the beams 304 to 306 and 308 to 311 is a communication beam including a beam of FR1 that is a first beam and a beam of FR2 that is a second beam. Note that each communication beam is also used when an uplink signal from each mobile terminal is received. Each mobile terminal transmits an uplink signal using the first beam and/or the second beam constituting the communication beam radiated toward the mobile terminal itself.

The beams 304, 311, 309, and 308 are radiated toward the multi-connection terminals (mobile terminals 320, 316, 315, and 317, respectively). The beams 306 and 310 are radiated toward the low-latency terminals (mobile terminals 318 and 314, respectively). The beam 305 is radiated toward the large-capacity terminal (mobile terminal 319).

The area in which the mobile terminal 319, which is a large-capacity terminal, and the mobile terminal 317, which is a multi-connection terminal, are located is a coverage 301 in which uplink and downlink communication can be performed with the frequency of FR2, which is the second frequency. In addition, the area in which the mobile terminals 315, 316, and 320, which are multi-connection terminals, and the mobile terminals 314 and 318, which are low-latency terminals, are located is a coverage 302 in which downlink communication can be performed with the frequency of FR2. Note that the reason why uplink communication is possible in the coverage 301 but not possible in the coverage 302 is attributed to the frequency characteristics of FR2: at high frequencies such as millimeter waves, because of the problem of amplifier transmission power, downlink radio waves from the base station 307 reach mobile terminals, whereas uplink radio waves from mobile terminals do not reach the base station 307 due to transmission power shortage. This problem often occurs in multi-connection terminals such as Internet of Things (IoT) terminals. In large-capacity terminals and low-latency terminals, which have a large device size and a large battery capacity, the problem of transmission power shortage may not occur. Therefore, in some cases, the mobile terminals 314 and 318, which are low-latency terminals, can perform uplink communication even in the area of the coverage 302. A coverage 303 is a coverage that uses the frequency of FR1, which is the first frequency. The coverage 303 is SUL that is discussed in 3GPP to resolve the foregoing problem, and only uplink is possible in the coverage 303. Therefore, the multi-connection terminals (mobile terminals 315, 316, and 320) present in the coverage 302 and the coverage 303 perform uplink transmission using the coverage 303.

A virtual cell 312 is a cell present in the coverage 302. In the virtual cell 312, a multi-connection terminal having small transmission power cannot perform uplink communication (uplink communication using FR2). A virtual cell 313 is a virtual cell present in the coverage 301. In the virtual cell 313, even a multi-connection terminal having small transmission power can perform uplink communication.

Figure 4:
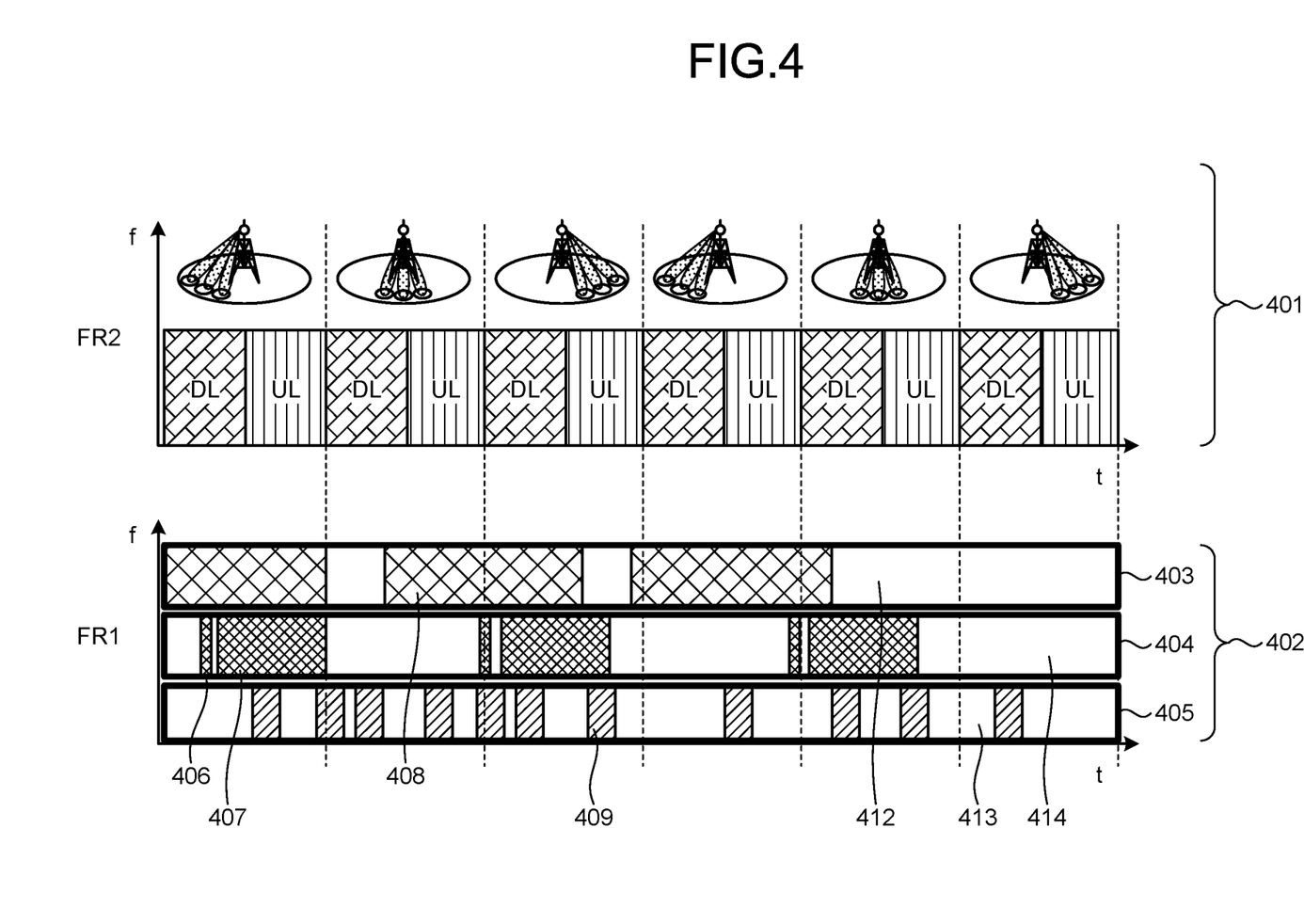
FIG. 4 is a diagram for explaining an operation in which the base station illustrated in FIG. 3 forms beams, and an anticipated problem.

FIG. 4 is a diagram for explaining an operation in which the base station 307 illustrated in FIG. 3 forms beams and an anticipated problem. An upper part 401 of FIG. 4 indicates an example of a method in which the base station 307 radiates beams to each virtual cell including the virtual cell 312 and the virtual cell 313 illustrated in FIG. 3, specifically, an example of a beam radiation method in which the number of virtual cells is larger than the maximum number of beams that can be simultaneously radiated. This example is based on the assumption that the number of beams that can be simultaneously radiated is three and the number of virtual cells is nine. In this case, the base station 307 radiates beams in different directions at three timings to radiate directional beams to all the virtual cells in the coverage 301 and the coverage 302. Note that the number of beams that can be simultaneously radiated is the upper limit value of the number of beams that the base station 307 can simultaneously form.

A lower part 402 of FIG. 4 indicates an example of how radio resources are used when mobile terminals of three service types connected to a base station to which the communication device according to the present disclosure is not applied perform uplink transmission. The mobile terminals of three service types are assumed to be low-latency terminals, large-capacity terminals, and multi-connection terminals as described above.

The lower part 402 of FIG. 4 shows three RAN slices: a RAN slice 403 for low-latency terminals, a RAN slice 404 for large-capacity terminals, and a RAN slice 405 for multi-connection terminals in order from the top. Inside each of these RAN slices, radio resources for use in uplink transmission are shown. The radio resources for use in uplink transmission include radio resources 408 for use by low-latency terminals, radio resources 406 for use by large-capacity terminals in communication for reserving radio resources for data transmission, radio resources 407 for use by large-capacity terminals in data transmission, and radio resources 409 for use by multi-connection terminals. Uplink transmission is not always performed in each RAN slice, which may waste some resources. Specifically, the RAN slice 403 for low-latency terminals has waste resources 412, and the RAN slice 404 for large-capacity terminals has waste resources 414. In addition, the RAN slice 405 for multi-connection terminals has waste resources 413. In order to reduce these waste resources, the communication device according to the present embodiment aggregates the radio resources 409 for multi-connection terminals in the RAN slice 405 for multi-connection terminals.

Figure 5:
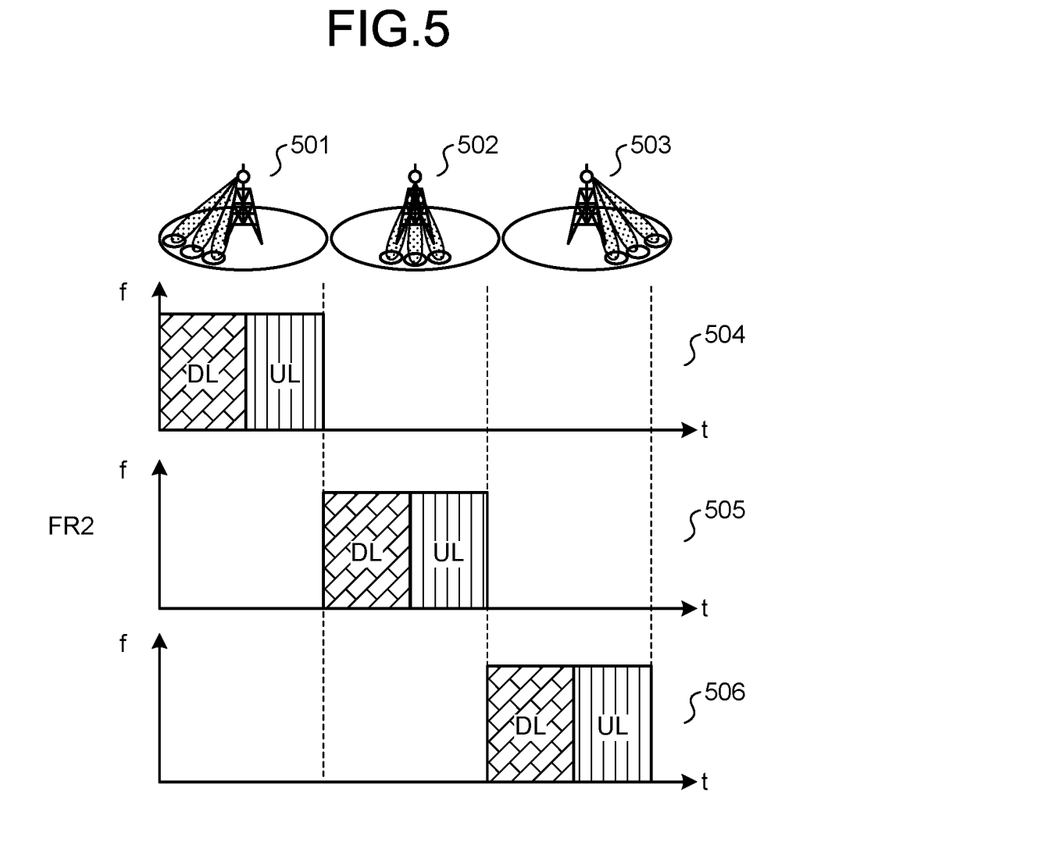
FIG. 5 is a diagram illustrating an example of a method in which the base station time-divisionally transmits beams of FR2.

FIG. 5 is a diagram illustrating an example of a method in which the base station 307 time-divisionally transmits beams of FR2. When radiating beams as in a transmission operation 501, the base station 307 performs downlink and uplink transmission as indicated by a timing 504. Similarly, when radiating beams as in a transmission operation 502, the base station 307 performs downlink and uplink transmission as indicated by a timing 505. When radiating beams as in a transmission operation 503, the base station 307 performs downlink and uplink transmission as indicated by a timing 506.

A specific example of aggregating the radio resources 409 for multi-connection terminals in the RAN slice 405 for multi-connection terminals illustrated in FIG. 4 will be described.

Figure 6:
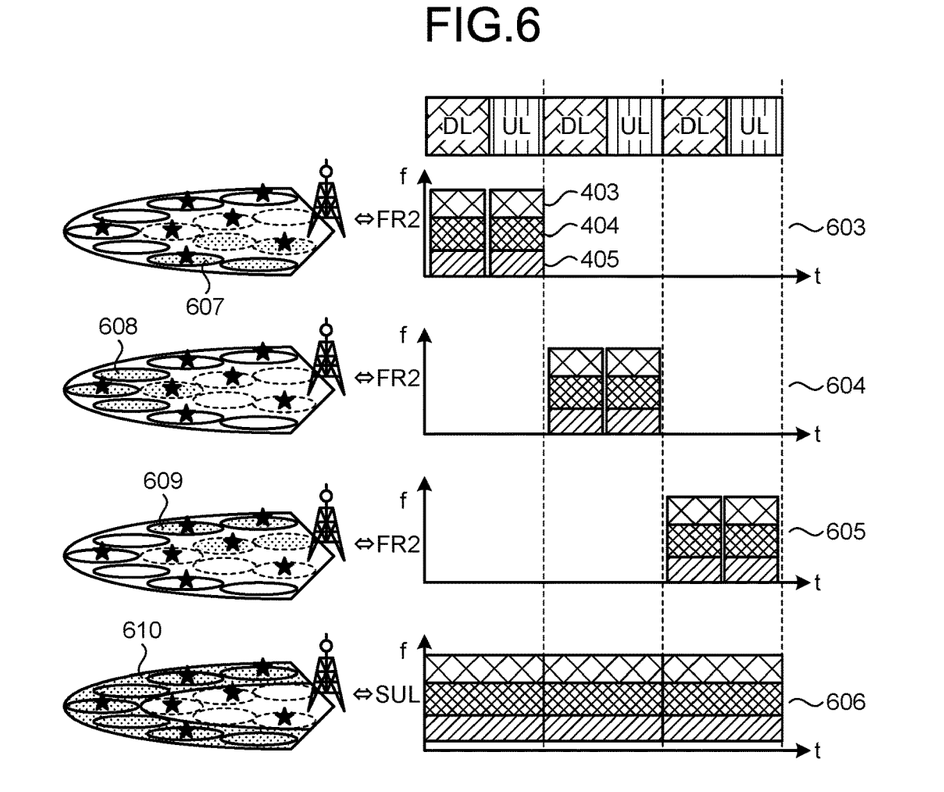
FIG. 6 is a diagram illustrating an exemplary state of the wireless communication system in which the problem is unsolved.

FIG. 6 is a diagram illustrating an exemplary state of the wireless communication system in which the problem is unsolved, specifically, an exemplary state in which the radio resources for multi-connection terminals are unaggregated.

FIG. 6 illustrates an example in which there are 12 virtual cells. A virtual cell group 607 on the uppermost row indicates the case of putting together four virtual cells located on the left side as viewed from the base station in the direction in which each virtual cell exists, and radiating four beams to these virtual cells. A virtual cell group 608 on the second row indicates the case of putting together four virtual cells located at the center as viewed from the base station in the direction in which each virtual cell exists, and radiating four beams to these virtual cells. A virtual cell group 609 on the third row indicates the case of putting together four virtual cells located on the right side as viewed from the base station in the direction in which each virtual cell exists, and radiating four beams to these virtual cells. A virtual cell group 610 on the fourth row indicates the case of putting together the virtual cells located at the edge of the coverage, and radiating beams to these virtual cells.

The virtual cell groups 607, 608, and 609 use the frequency of FR2. The virtual cell group 610 uses the frequency of FR1. The reason why the virtual cell group 610 is U-shaped is that only the virtual cell group 610 is in the range of the coverage 302 illustrated in FIG. 3. In FIG. 6, star marks indicate the locations of multi-connection terminals. The virtual cell groups 607, 608, 609, and 610 include, at all radiation timings, a virtual cell in which a multi-connection terminal is located, a virtual cell constituting the coverage 301 illustrated in FIG. 3, and a virtual cell constituting the coverage 302 illustrated in FIG. 3. Therefore, the slice for each service type at the radiation timing for the virtual cell group 607 is in a slice allocation state 603, which has slices of three service types: the RAN slice 403 for low-latency terminals, the RAN slice 404 for large-capacity terminals, and the RAN slice 405 for multi-connection terminals. Similarly, the slice for each service type at the radiation timing for the virtual cell group 608 is in a slice allocation state 604, which has slices of three service types in the same manner as the slice allocation state 603. Similarly, the slice for each service type at the radiation timing for the virtual cell group 609 is in a slice allocation state 605, which has slices of three service types in the same manner as the slice allocation states 603 and 604. That is, there are slices of three service types at all timings, and multi-connection terminals are located in the range of the virtual cell groups 607, 608, and 609 corresponding to the coverage 302. Therefore, a slice allocation state 606 of the SUL using the frequency of FR1 also includes slices of three service types (RAN slice for low-latency terminals, RAN slice for large-capacity terminals, and RAN slice for multi-connection terminals).

In the state in which RAN slices are allocated as illustrated in FIG. 6, unless the radio resources 408 for use by low-latency terminals, the radio resources 407 for use by large-capacity terminals, the radio resources 406 for use by large-capacity terminals in communication for reserving radio resources for data transmission, and the radio resources 409 for use by multi-connection terminals described with reference to FIG. 4 are arranged densely, the above-described waste resources 412, 413, and 414 hinder the effective utilization of the radio resources.

Figure 7:
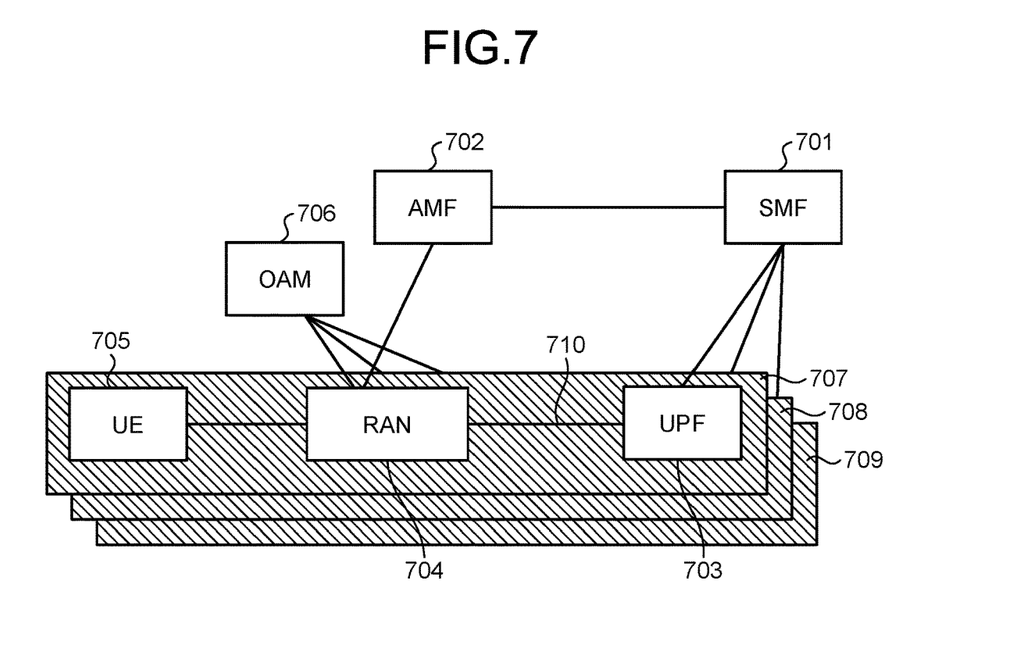
FIG. 7 is a diagram illustrating a typical example of the configuration of a 5GC.

FIG. 7 is a diagram illustrating a typical example of the configuration of a 5GC. Session Management Function (SMF) 701 is Control Plane (C-Plane) and is a functional block selected by a core slice 710. UPF 703 is a packet transfer functional block that exists for each slice and includes Software-Defined Networking (SDN). AMF 702 is a functional block that performs location management of mobile terminals, and is Management Plane (M-Plane). The AMF 702 notifies the RAN 704 of terminal movement management information. Operations, Administration, and Maintenance (OAM) 706 is a maintenance monitoring functional block, and can set device parameters to the RAN 704. UE 705 is a mobile terminal, and logically generates the RAN 704 and a slice 707. Slices 707, 708, and 709 are slices for different service types, and correspond in ascending order to the RAN slice 403 for low-latency terminals, the RAN slice 404 for large-capacity terminals, and the RAN slice 405 for multi-connection terminals described above. Regarding the core slice 710, a plurality of core slices can be generated regardless of service type.

The communication device according to the present embodiment can be implemented by adding a function to operate as the beam control unit 203 illustrated in FIG. 2 to the RAN 704 illustrated in FIG. 7 and adding a function to the OAM 706, the AMF 702, and the SMF 701. A specific processing operation of the beam control unit 203 will be described with reference to FIGS. 8 and 2.

In the beam control unit 203 illustrated in FIG. 2, the grouping processing unit 204 is characterized by aggregating and grouping the virtual cells in which multi-connection terminals that use SUL are located in order to synchronize the radiation timings of the beams to be formed toward the multi-connection terminals that use SUL. That is, the grouping processing unit 204 performs grouping such that the virtual cells in which multi-connection terminals which are present in the coverage 303 illustrated in FIG. 3 and perform uplink transmission using SUL because of the unavailability of FR2-based uplink transmission are located are put into the same group. In addition, the beam control unit 203 is characterized by detecting the number of times uplink transmission has collided in the slice for each service type, re-executing grouping processing when the number of collisions exceeds a threshold, and dividing the virtual cells in which multi-connection terminals are located into a plurality of groups. Consequently, it is possible to reduce the number of collision occurrences in uplink transmission and achieve high-quality communication. Therefore, the beam control unit 203 is also characterized by being capable of dividing a beam radiation timing through group dividing. In addition, the beam control unit 203 is also characterized by determining the above-described threshold based on the radiation area and the radiation cross-sectional length of a beam that is radiated to the virtual cells. The above-described threshold may be determined based on the number of terminals located in the virtual cells. In addition, the above-described threshold may be determined based on the radiation area and the radiation cross-sectional length of a beam that is radiated to the virtual cells, and on the number of terminals located in the virtual cells.

The group selection unit 207 is characterized by setting a beam radiation timing in consideration of the intermittent transmission/reception cycle of the multi-connection terminals that use SUL. The distribution control unit 205 is characterized by receiving slice information from the SMF 701, and determining the distribution ratio of the radio resources of FR1 (SUL) and FR2 based on the slice information. The distribution control unit 205 also performs distribution selection. That is, for each of FR1 and FR2, the distribution control unit 205 selects through distribution selection a radio resource allocation to each slice, that is, the time, frequency, and space to be allocated to each slice. Here, the space means the direction in which a beam is formed, and the selection of the space means the selection of the virtual cell to which a beam is transmitted.

Figure 8:
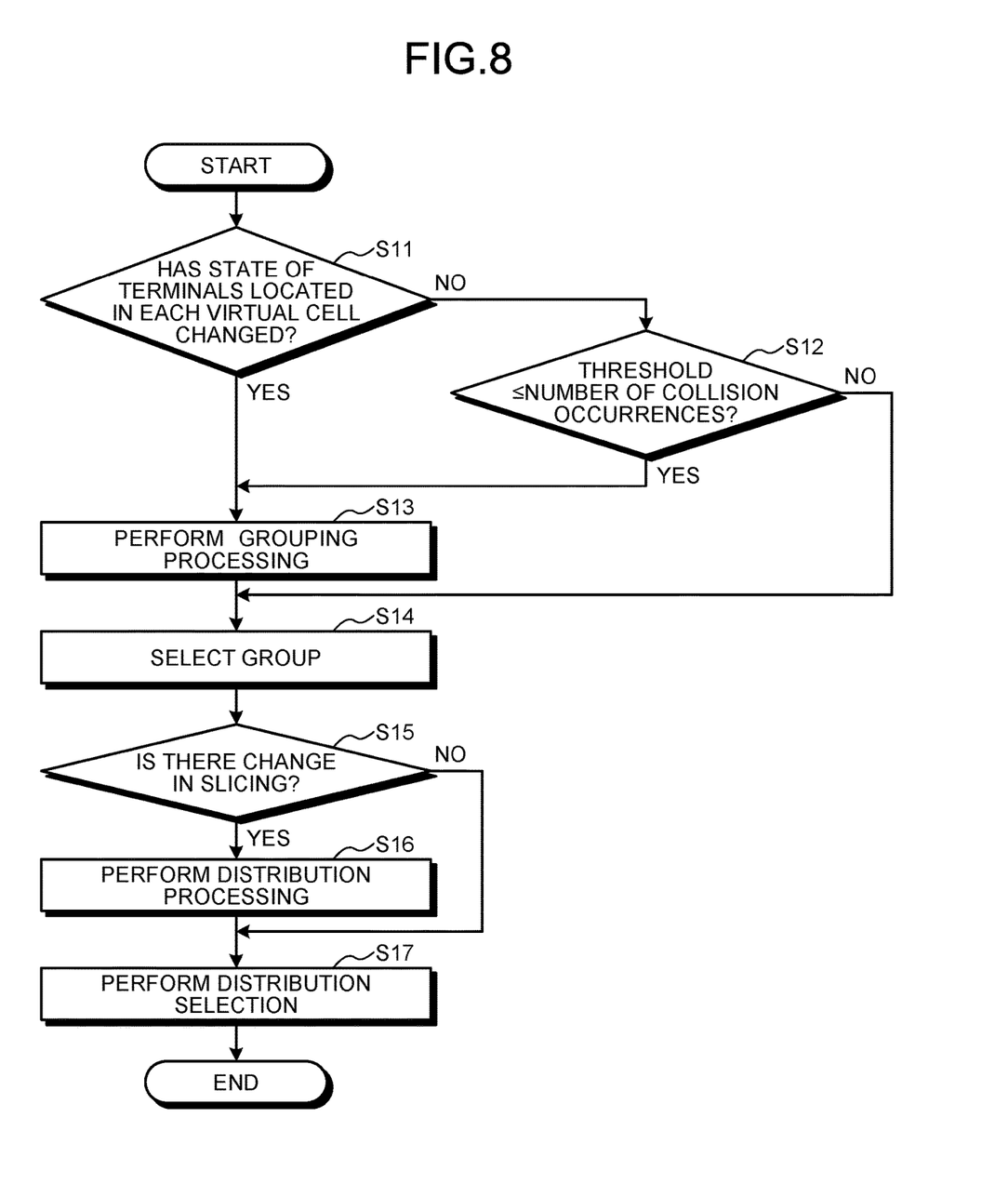
FIG. 8 is a flowchart illustrating an example of the operation of the beam control unit illustrated in FIG. 2.

FIG. 8 is a flowchart illustrating an example of the operation of the beam control unit 203 illustrated in FIG. 2. The beam control unit 203 executes the operation illustrated in FIG. 8 before the timing to start beam radiation. In the beam control unit 203, first, the grouping processing unit 204 confirms whether the state of terminals located in each virtual cell has changed (step S11). In step S11, when a mobile terminal is added, deleted, or moved between virtual cells, the grouping processing unit 204 determines that the state of terminals located in each virtual cell has changed. That is, when the number of virtual cells in which a mobile terminal is located increases or decreases, or the virtual cell in which a mobile terminal is located changes due to the movement of the mobile terminal, the grouping processing unit 204 determines that the state of terminals located in each virtual cell has changed.

In response to determining that the state of terminals located in each virtual cell has not changed (step S11: No), the grouping processing unit 204 counts the number of times that uplink transmission collision has occurred in the slices of SUL (hereinafter referred to as the number of collision occurrences), and confirms whether the number of collision occurrences is equal to or larger than a predetermined threshold (step S12). In response to confirming that the number of collision occurrences is equal to or larger than the threshold (step S12: Yes), the grouping processing unit 204 performs grouping processing (step S13). In a case where grouping processing in step S13 is performed after step S12, the grouping processing unit 204 performs grouping to increase the number of groups that aggregate the virtual cells in which multi-connection terminals that use SUL are located. For example, in a case where the number of collision occurrences becomes equal to or larger than the threshold while the virtual cells in which multi-connection terminals that use SUL are located are aggregated into N groups (N is an integer of one or more), the grouping processing unit 204 aggregates the virtual cells in which multi-connection terminals that use SUL are located into N+1 groups in grouping processing.

In response to confirming that the number of collision occurrences is less than the threshold (step S12: No), the group selection unit 207 performs group selection processing without performing grouping processing by the grouping processing unit 204 (step S14). In step S14, the group selection unit 207 selects the group to which beams are radiated. That is, the group selection unit 207 determines which group beams are to be radiated to the virtual cells belonging thereto at the next beam radiation timing.

In addition, in response to determining that the state of terminals located in each virtual cell has changed (step S11: Yes), the grouping processing unit 204 performs grouping processing on the multi-connection terminals that use SUL (step S13). A specific example of the operation in which the grouping processing unit 204 executes step S13 to create a group of virtual cells without going through step S12 will be described later.

Once the group selection processing by the group selection unit 207 in step S14 is completed, the distribution control unit 205 confirms whether there is a change in slicing (step S15). Specifically, the distribution control unit 205 acquires slice information from the SMF 701 illustrated in FIG. 7, and confirms whether there is a change in slice information.

In response to confirming that there is a change in slicing (step S15: Yes), the distribution control unit 205 performs distribution processing to distribute radio resources to each slice (step S16). Next, the distribution control unit 205 performs distribution selection, and allocates radio resources to each slice (step S17).

On the other hand, in response to confirming that there is no change in slicing (step S15: No), the distribution control unit 205 performs distribution selection without executing the distribution processing of step S16 (step S17). After step S17, the operation of the beam control unit 203 is finished. Thereafter, the beam forming unit 206 controls the antenna unit 201 according to the radio resource allocation result in step S17 so that beams are radiated within the coverage.

A specific example of the grouping processing in step S13, the group selection in step S14, the distribution processing in step S16, and the distribution selection in step S17 will be described.

Figure 9:
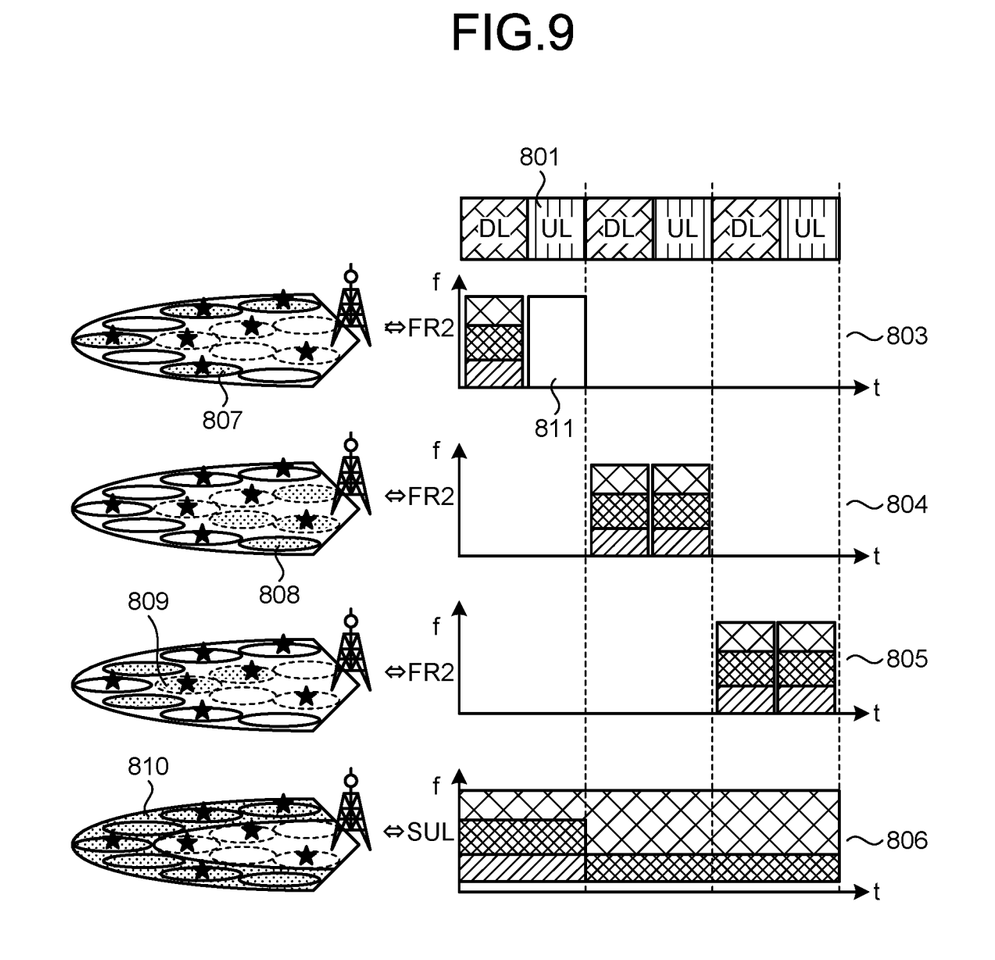
FIG. 9 is a diagram illustrating an exemplary state of the wireless communication system in which the problem has been solved.

FIG. 9 is a diagram illustrating an exemplary state of the wireless communication system in which the problem has been solved, specifically, an exemplary state in which the radio resources for multi-connection terminals have been aggregated. FIG. 9 illustrates a state obtained by executing the operation illustrated in FIG. 8 in the state illustrated in FIG. 6 to aggregate the radio resources for multi-connection terminals, that is, a state obtained after the virtual cells in which multi-connection terminals are located are aggregated into the same group.

The grouping processing unit 204 performs grouping processing to set virtual cell groups 807 to 810 illustrated in FIG. 9. Specifically, the grouping processing unit 204 first sets the virtual cell group 807 illustrated in the uppermost row of FIG. 9. That is, the grouping processing unit 204 sets, as the virtual cell group 807, the beams to be radiated to the virtual cells included in the coverage 302 illustrated in FIG. 3 and in which multi-connection terminals are located. Next, the grouping processing unit 204 sets the virtual cell group 808 illustrated in the second row and the virtual cell group 809 illustrated in the third row of FIG. 9. That is, the grouping processing unit 204 sets the virtual cell groups 808 and 809 so that the virtual cells that do not belong to the virtual cell group 807 can be covered with the minimum number of times of beam radiation. Here, in a case where the number of virtual cells that do not belong to the virtual cell group 807 is not divided by the number of beams that can be simultaneously radiated, that is, in a case where there is an extra beam, the grouping processing unit 204 performs grouping such that the extra beam is radiated to the virtual cell in which a low-latency terminal is located.

In this manner, the grouping processing unit 204 performs grouping such that the virtual cells in the coverage 302 in which multi-connection terminals are located belong only to the virtual cell group 807. At this time, by preventing the virtual cells in the coverage 301 in which multi-connection terminals are located from belonging to the virtual cell group 807, it is possible to leave a radio resource 811 unallocated at the timing of an uplink 801 in a slice allocation state 803. By redistributing the unallocated radio resource 811 to the uplink for large-capacity terminals and the uplink for low-latency terminals, it is possible to improve the use efficiency of uplink radio resources. Note that slice allocation states 804 and 805 are similar to the slice allocation states 604 and 605 illustrated in FIG. 6.

In a case where the number of virtual cells (hereinafter referred to as aggregation target cells) included in the coverage 302 and in which multi-connection terminals are located is larger than the number of beams that can be simultaneously radiated, the aggregation target cells are divided into a plurality of groups. For example, when the number of beams that can be simultaneously radiated is four and the number of aggregation target cells is five, the grouping processing unit 204 performs grouping such that the aggregation target cells are aggregated into two groups. That is, when the number of beams that can be simultaneously radiated is B and the number of aggregation target cells is C, the grouping processing unit 204 performs grouping such that the aggregation target cells are aggregated into k groups, where k is a number obtained by dividing C by B and adding one to the quotient.

In addition, the coverage 303, which is the SUL coverage of FR1 to be used by the mobile terminals located in the coverage 302 illustrated in FIG. 3, corresponds to the range in which each virtual cell belonging to the virtual cell group 810 illustrated in FIG. 9 is present. Since the virtual cells included in the coverage 302 and in which multi-connection terminals are located are aggregated into the virtual cell group 807 through the grouping processing, a slice allocation state 806 in the SUL has three slices corresponding one-to-one to the three service types at the radiation timing of the beams to the virtual cells belonging to the virtual cell group 807. On the other hand, in the slice allocation state 806 in the SUL, it is not necessary to set a slice for multi-connection terminals at the radiation timing of the beams to the virtual cells belonging to the virtual cell group 808 and the radiation timing of the beams to the virtual cells belonging to the virtual cell group 809. Therefore, at the timing of radiating beams to the virtual cells belonging to the virtual cell groups 808 and 809, it is possible to increase the radio resources allocated to the slices of service types other than multi-connection terminals. In the example illustrated in FIG. 9, at the timing of radiating beams to the virtual cells belonging to the virtual cell groups 808 and 809, the distribution ratio of radio resources in the SUL is changed to allocate radio resources to the RAN slice 403 for low-latency terminals instead of the slice for multi-connection terminals.

Note that, in a case where multi-connection terminals perform intermittent reception or intermittent transmission/reception to reduce battery consumption, the radiation cycle of beams to the virtual cells belonging to the virtual cell group 807 is the activation timing of the multi-connection terminals.

At the timing of radiating beams to the virtual cells belonging to the virtual cell group 807, in a case where the number of collision occurrences in uplink transmission in the RAN slice 405 for multi-connection terminals is equal to or larger than the threshold, the grouping processing unit 204 re-executes grouping processing to divide the group, as described above. At this time, the grouping processing unit 204 allocates a virtual cell in which a mobile terminal with heavy battery consumption is located to a virtual cell group capable of taking a longer intermittent reception cycle. The grouping processing unit 204 collects the battery consumption amount of each mobile terminal from each mobile terminal using, for example, a monitoring function, a maintenance function, and the like. The beam forming unit 206 sets the beam radiation timing for a virtual cell group in which a mobile terminal with heavy battery consumption is located to a longer cycle than that for other virtual cell groups and radiates beams, thereby reducing the battery consumption of the mobile terminal. In a case where a terminal with high battery consumption and a terminal with low battery consumption are located in one virtual cell, battery consumption is reduced using the existing technique of Discontinuous Reception (DRX). In addition, for a virtual cell in which a multi-connection terminal that needs to perform uplink transmission frequently is located, the grouping processing unit 204 divides the group such that uplink resources can be transmitted in a plurality of groups, that is, performs grouping processing such that the virtual cell in which the multi-connection terminal that needs to perform uplink transmission frequently is located belongs to all the post-division groups.

Here, a means by which the grouping processing unit 204 detects the occurrence of an uplink transmission collision in a slice will be described.

A possible means for detecting the occurrence of an uplink transmission collision in a slice is to acquire collision information of uplink transmission in the slice from the OAM 706 illustrated in FIG. 7 and confirming the collision information to determine whether a collision has occurred. The RAN 704 of each slice reports the number of collision occurrences in uplink transmission to the OAM 706 as measurement information. Based on this information, the grouping processing unit 204 obtains the number of collision occurrences in uplink transmission in the slice. In addition, the grouping processing unit 204 acquires, from the AMF 702, movement information of terminals and information on terminals that use SUL.

Figure 10:
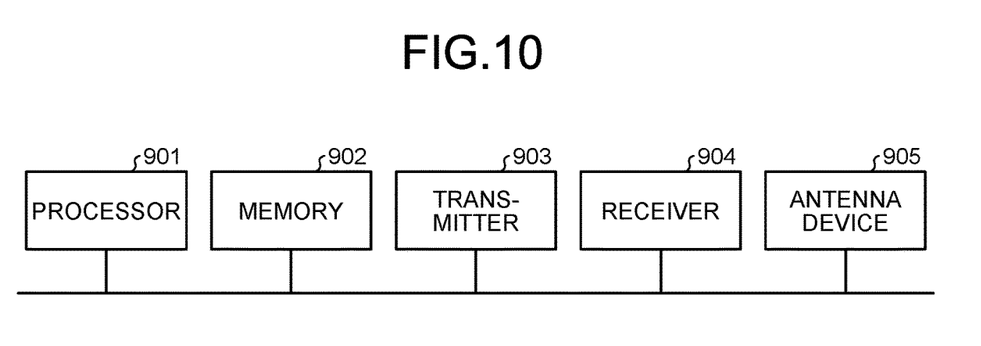
FIG. 10 is a diagram illustrating a first example of hardware for implementing a base station.

Finally, a hardware configuration of the base station 103 will be described. For example, the base station 103 is implemented by the hardware illustrated in FIG. 10, specifically, a processor 901, a memory 902, a transmitter 903, a receiver 904, and an antenna device 905. FIG. 10 is a diagram illustrating a first example of hardware for implementing the base station 103.

The processor 901 is a central processing unit (CPU, also referred to as a central processing device, a processing device, a computation device, a microprocessor, a microcomputer, or a digital signal processor (DSP)), a system large scale integration (LSI), or the like. The memory 902 is a random access memory (RAM), a read only memory (ROM), an erasable programmable read only memory (EPROM), an electrically erasable programmable read only memory (EEPROM, registered trademark), or the like.

The antenna unit 201 of the base station 103 illustrated in FIG. 2 is implemented by the antenna device 905 described above. The transmission/reception unit 202 is implemented by the transmitter 903 and the receiver 904 described above. The beam control unit 203 is implemented by the processor 901 and the memory 902 described above. That is, programs for operating as the grouping processing unit 204, the distribution control unit 205, the beam forming unit 206, and the group selection unit 207 of the beam control unit 203 are stored in the memory 902, and the processor 901 reads and executes this program to implement the grouping processing unit 204, the distribution control unit 205, the beam forming unit 206, and the group selection unit 207 of the beam control unit 203.

Figure 11:
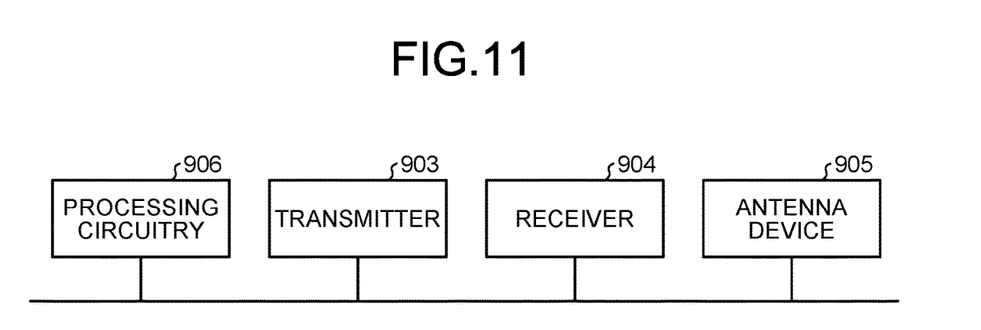
FIG. 11 is a diagram illustrating a second example of hardware for implementing a base station.

The base station 103 can also be implemented by the hardware illustrated in FIG. 11. FIG. 11 is a diagram illustrating a second example of hardware for implementing the base station 103. The hardware illustrated in FIG. 11 is configured by replacing the processor 901 and the memory 902 of the hardware illustrated in FIG. 10 with a processing circuitry 906. That is, FIG. 11 illustrates hardware in which the beam control unit 203 of the base station 103 is implemented by the processing circuitry 906. The processing circuitry 906 is a dedicated processing circuitry for implementing the beam control unit 203, exemplified by a single circuit, a composite circuit, an application specific integrated circuit (ASIC), a field-programmable gate array (FPGA), or a circuitry that is a combination thereof.

Note that one or more components of the grouping processing unit 204, the distribution control unit 205, the beam forming unit 206, and the group selection unit 207 of the beam control unit 203 may be implemented by the processing circuitry 906 illustrated in FIG. 11, and the remaining components may be implemented by the processor 901 and the memory 902 illustrated in FIG. 10.

As described above, the base station 103 according to the present embodiment aggregates, among the virtual cells constituting the coverage, the virtual cells in which mobile terminals capable of uplink communication using the first beam having a long propagation distance but incapable of uplink communication using the second beam having a shorter propagation distance than the first beam are located into one or a small number of groups, and radiates beams to all the aggregated virtual cells at the same timing. Consequently, it is possible to produce a beam radiation timing at which the number of service types of mobile terminals allocated to the slice is smaller than that at other beam radiation timings, and it is possible to prevent or reduce the waste of radio resources and improve the use efficiency of radio resources.

The communication device according to the present disclosure can achieve the effect of improving the use efficiency of radio resources.

The configurations described in the above-mentioned embodiment indicate examples of the contents of the present disclosure. The configurations can be combined with another well-known technique, and some of the configurations can be omitted or changed in a range not departing from the gist of the present disclosure.

What is claimed is:

1. A communication device implemented within a constituting a-base station that communicates with a plurality of mobile terminals by radiating communication beams within a coverage, the communication beams including a first beam and a second beam having a shorter radio wave propagation distance than the first beam at a same transmission power, the coverage including a plurality of virtual cells, the communication device comprising:
   a processor configured to
      determine, for each of the plurality of mobile terminals, a capability of the mobile terminal for uplink communication using the first and second beams, and one of the plurality of virtual cells within which the mobile terminal is located, and
      based on the determinations, sorting the plurality of virtual cells into groups by aggregating, into a first group, only virtual cells within which mobile terminals determined to be capable of uplink communication using the first beam and incapable of uplink communication using the second beam are located; and
   a beam forming circuitry to control a radiation direction of the communication beams in a time-division manner by radiating both the first and second beams toward all virtual cells belonging to the first group at a particular timing of a cycle, and redirecting at least the second beam away from the virtual cells belonging to the first group and toward the virtual cells belonging to other groups at other timings of the cycle.

2. The communication device according to claim 1, wherein
   the first beam is a beam dedicated to uplink communication.

3. The communication device according to claim 1, wherein when a number of aggregation target cells that are virtual cells in which mobile terminals determined to be capable of uplink communication using the first beam and incapable of uplink communication using the second beam are located is equal to or less than a maximum number of beams that the base station is capable of radiating simultaneously, the processor performs the sorting such that all the aggregation target cells are put into the first group.

4. The communication device according to claim 3, wherein
when a number of collision occurrences in signals transmitted from mobile terminals located in the aggregation target cells in the first group is equal to or larger than a threshold,
the processor re-executes the sorting to aggregate the aggregation target cells separately into two or more groups even when the number of aggregation target cells is equal to or less than the maximum number.

5. The communication device according to claim 4, wherein
the threshold is determined based on a radiation area and a radiation cross-sectional length of a beam that is radiated to the aggregation target cells.

6. The communication device according to claim 4, wherein
the threshold is determined based on a number of terminals located in the aggregation target cells.

7. The communication device according to claim 4, wherein
the threshold is determined based on a radiation area and a radiation cross-sectional length of a beam that is radiated to the aggregation target cells, and on a number of terminals located in the aggregation target cells.

8. The communication device according to claim 4, wherein
when aggregating the aggregation target cells separately into two or more groups, the grouping processing circuitry performs grouping such that aggregation target cells in which mobile terminals having a higher battery consumption than other mobile terminals are located are put into a same group.

9. The communication device according to claim 3, further comprising
a distribution control circuitry to distribute, at a timing of radiating beams to virtual cells in a group that does not include the aggregation target cells, a radio resource of the first beam secured to be allocated to the mobile terminals located in the aggregation target cells to the virtual cells belonging to the group to which beams are radiated.

10. The communication device according to claim 3, wherein
the grouping processing circuitry performs grouping such that a virtual cell in which a mobile terminal having a same service type as the mobile terminals located in the aggregation target cells and capable of uplink communication using the second beam is located is not put into a same group as the aggregation target cells.

11. The communication device according to claim 1, wherein
the grouping processing circuitry re-executes the grouping in response to a change in a number of mobile terminals present in the coverage or to a movement of one or more mobile terminals present in the coverage between virtual cells.

12. A control circuit that controls a base station that communicates with a plurality of mobile terminals by radiating communication beams within a coverage, the communication beams including a first beam and a second beam having a shorter radio wave propagation distance than the first beam at a same transmission power, the coverage including a plurality of virtual cells, the control circuit causing the base station to execute:
determining, for each of the plurality of mobile terminals, a capability of the mobile terminal for uplink communication using the first and second beams, and one of the plurality of virtual cells within which the mobile terminal is located, and
based on the determining, sorting the plurality of virtual cells into groups by aggregating, into a first group, only virtual cells within which mobile terminals determined to be capable of uplink communication using the first beam and incapable of uplink communication using the second beam are located; and
controlling a radiation direction of the communication beams in a time-division manner by radiating both the first and second beams toward all virtual cells belonging to the first group at a particular timing of a cycle, and redirecting at least the second beam away from the virtual cells belonging to the first group and toward the virtual cells belonging to other groups at other timings of the cycle.

13. A non-transitory computer-readable storage medium that stores a program for controlling a base station that communicates with a plurality of mobile terminals by radiating communication beams within a coverage, the communication beams including a first beam and a second beam having a shorter radio wave propagation distance than the first beam at a same transmission power, the coverage including a plurality of virtual cells, the program causing the base station to execute:
determining, for each of the plurality of mobile terminals, a capability of the mobile terminal for uplink communication using the first and second beams, and one of the plurality of virtual cells within which the mobile terminal is located, and
based on the determining, sorting the plurality of virtual cells into groups by aggregating, into a first group, only virtual cells within which mobile terminals determined to be capable of uplink communication using the first beam and incapable of uplink communication using the second beam are located; and
controlling a radiation direction of the communication beams in a time-division manner by radiating both the first and second beams are radiated toward all virtual cells belonging to the first group at a particular timing of a cycle, and redirecting at least the second beam away from the virtual cells belonging to the first group and toward the virtual cells belonging to other groups at other timings of the cycle.

* * * * *